(12) United States Patent
Amirault et al.

(10) Patent No.: US 6,682,143 B2
(45) Date of Patent: Jan. 27, 2004

(54) BOOSTER SEAT

(75) Inventors: David Amirault, Troy, OH (US); Mark Geis, Tipp city, OH (US); Dennis Karns, St. Paris, OH (US)

(73) Assignee: Evenflo Company, Inc., Vandalia, OH (US)

(*) Notice: Subject to any disclaimer, the term of this patent is extended or adjusted under 35 U.S.C. 154(b) by 0 days.

(21) Appl. No.: 10/081,026

(22) Filed: Feb. 21, 2002

(65) Prior Publication Data

US 2003/0155797 A1 Aug. 21, 2003

(51) Int. Cl.[7] ................................................. B60N 2/28
(52) U.S. Cl. ........................... 297/250.1; 297/423.19; 297/423.2; 297/284.11; 297/411.32; 297/391; 297/406; 297/464
(58) Field of Search ................................ 297/391, 406, 297/284.11, 250.1, 411.32, 411.35, 423.17, 423.2, 410, 407, 344.18

(56) References Cited

U.S. PATENT DOCUMENTS

| | | | |
|---|---|---|---|
| 207,316 A | | 8/1878 | Starr |
| 806,678 A | * | 12/1905 | Kelly ...................... 297/423.2 |
| 2,085,836 A | | 7/1937 | Tatum |
| 2,480,300 A | * | 8/1949 | Luketa .................... 297/423.2 |
| 2,555,814 A | | 6/1951 | Pulsifer |
| 3,544,162 A | * | 12/1970 | Uchiyamada et al. ....... 297/410 |
| D234,033 S | | 1/1975 | Tarbet |
| 3,888,540 A | | 6/1975 | Protze et al. |
| 4,130,318 A | | 12/1978 | Hemmen et al. |
| 4,165,126 A | | 8/1979 | Strien et al. |
| 4,205,878 A | | 6/1980 | Wooten |
| 4,324,431 A | | 4/1982 | Murphy et al. |
| 4,519,650 A | * | 5/1985 | Terada et al. ........... 297/452.18 |
| 4,541,669 A | | 9/1985 | Göldner |
| 4,664,444 A | | 5/1987 | Murphy .................... 297/284 |
| 4,854,639 A | * | 8/1989 | Burleigh et al. ......... 297/250.1 |
| 4,915,447 A | | 4/1990 | Shovar |

(List continued on next page.)

FOREIGN PATENT DOCUMENTS

| | | | |
|---|---|---|---|
| CA | 2077119 | 8/1992 | |
| CA | 2118727 | 3/1994 | |
| EP | 576847 A2 | * 1/1994 | ............ B60N/2/28 |
| WO | WO 9428454 A1 | * 12/1994 | ............ G02C/5/22 |

OTHER PUBLICATIONS

*Recaro car seats* (3 pages) (date unknown) Admitted to be prior art for the limited purpose of examination; applicant reserves the right to challenge the status of this reference as prior art. Not Considered, Insufficient Reference Date.

Photographs of various booster seats (2 pages; 7 photographs) (date unknown) Admitted to be prior art for the limited purpose of examination; applicant reserves the right to challenge the status of this reference as prior art. Not Considered, Insufficient Reference Date.

*Primary Examiner*—Peter M. Cuomo
*Assistant Examiner*—Stephen D'Adamo
(74) *Attorney, Agent, or Firm*—Taft, Stettinius & Hollister LLP

(57) ABSTRACT

A booster seat having a body including a seat back and a seat pan for supporting an occupant thereon and an adjustable thigh support coupled to the seat pan and being movable closer to or further away from the seat pan. The booster seat further includes a pair of adjustable arm rests coupled to the body, each arm rest being located on opposed sides of the body and being pivotable about an axis that extends generally transverse to the body. The booster seat includes a pair of head rests coupled to the seat back, each head rest being located on opposed sides of the seat back and being pivotable about an axis that extends generally along the height of the body.

16 Claims, 18 Drawing Sheets

U.S. PATENT DOCUMENTS

| | | | |
|---|---|---|---|
| 4,979,777 A | | 12/1990 | Takada |
| D315,255 S | | 3/1991 | Beermann ................... D6/356 |
| D317,533 S | | 6/1991 | Beermann ................... D6/356 |
| D317,534 S | | 6/1991 | Hänsel |
| D321,095 S | | 10/1991 | Bockwoldt |
| 5,054,853 A | * | 10/1991 | Gillies et al. ............ 297/250.1 |
| 5,294,182 A | | 3/1994 | Colasanti |
| 5,370,446 A | | 12/1994 | Bancod |
| D356,694 S | | 3/1995 | Armbrecht |
| 5,482,352 A | | 1/1996 | Leal et al. |
| 5,490,711 A | | 2/1996 | Pollock |
| 5,496,092 A | * | 3/1996 | Williams et al. ......... 297/250.1 |
| 5,529,379 A | * | 6/1996 | Stocker ..................... 297/410 |
| 5,531,505 A | | 7/1996 | Baetz et al. |
| 5,580,128 A | | 12/1996 | Johnson et al. |
| 5,586,810 A | | 12/1996 | Liu |
| 5,597,209 A | * | 1/1997 | Bart et al. ............. 297/411.38 |
| 5,601,338 A | | 2/1997 | Wahls |
| 5,609,367 A | | 3/1997 | Eusebi et al. |
| 5,624,156 A | | 4/1997 | Leal et al. |
| D383,316 S | | 9/1997 | Kain |
| D383,317 S | | 9/1997 | Kain |
| D383,911 S | | 9/1997 | Conforti et al. |
| 5,678,887 A | | 10/1997 | Sher |
| 5,678,892 A | * | 10/1997 | Heitlinger .............. 297/344.18 |
| D387,914 S | | 12/1997 | Beermann et al. |
| D388,966 S | | 1/1998 | Beermann et al. |
| D392,513 S | | 3/1998 | Reber |
| 5,733,004 A | | 3/1998 | Celestina-Krevh et al. |
| 5,752,742 A | * | 5/1998 | Kerner et al. ............... 297/391 |
| 5,755,490 A | | 5/1998 | Lamart |
| 5,769,495 A | * | 6/1998 | Vairinen ................ 294/411.32 |
| D396,152 S | | 7/1998 | Beermann et al. |
| 5,800,019 A | | 9/1998 | Knightlinger |
| 5,829,834 A | | 11/1998 | Silverman |
| 5,845,967 A | | 12/1998 | Kane et al. |
| 5,898,471 A | * | 4/1999 | Simioni et al. ............. 351/153 |
| 5,927,813 A | * | 7/1999 | Nemoto ..................... 297/391 |
| 5,934,749 A | | 8/1999 | Pond et al. |
| 5,961,088 A | | 10/1999 | Chabanne et al. |
| 5,984,254 A | | 11/1999 | Baloche et al. |
| 5,988,748 A | | 11/1999 | Morrison et al. |
| 6,106,063 A | | 8/2000 | Dauphin |
| 6,139,106 A | | 10/2000 | Aldridge |
| 6,203,101 B1 | * | 3/2001 | Chou et al. ................. 297/115 |
| 6,220,668 B1 | | 4/2001 | Scheffzück |
| 6,237,994 B1 | | 5/2001 | Bentley et al. |
| 6,250,716 B1 | | 6/2001 | Clough |
| 6,283,551 B1 | * | 9/2001 | Bergin ................... 297/411.35 |
| 6,375,265 B1 | * | 4/2002 | Hubner et al. ......... 297/411.32 |
| 6,412,866 B2 | * | 7/2002 | Koyanagi et al. ........ 297/250.1 |
| 6,467,847 B2 | * | 10/2002 | Bidare ................... 297/411.32 |
| 6,471,297 B1 | * | 10/2002 | Runde et al. .......... 294/411.32 |

\* cited by examiner

BOOSTER SEAT

The present invention is directed to a booster seat, and more particularly, to a booster seat including at least one of a thigh support, arm rest or head rest.

BACKGROUND OF THE INVENTION

Booster seats are commonly used to secure a child occupant to a vehicle seat. The booster typically provides a surface upon which the occupant can sit, and may include a belt guide or the like which can receive a vehicle seat belt therethrough to guide the vehicle belt across the occupant in a desired manner. The booster seat may also include various other features to increase the comfort of the occupant.

SUMMARY OF THE INVENTION

One embodiment of the present invention is a booster seat which includes an adjustable thigh support to provide upper thigh support to occupants of various sizes. The booster seat may also include a pair of adjustable arm rests to support the arms of the occupant, as well as an adjustable head rest to support the head of a occupant.

In one embodiment the invention is a booster seat having a body including a seat back and a seat pan for supporting an occupant thereon and an adjustable thigh support coupled to the seat pan and being movable closer to or further away from the seat pan. The booster seat further includes a pair of adjustable arm rests coupled to the body, each arm rest being located on opposed sides of the body and being pivotable about an axis that extends generally transverse to the body. The booster seat includes a pair of head rests coupled to the seat back, each head rest being located on opposed sides of the seat back and being pivotable about an axis that extends generally along the height of the body. Other objects and advantages of the present invention will be apparent from the following description and accompanying drawings.

DETAILED DESCRIPTION

Figure 1:
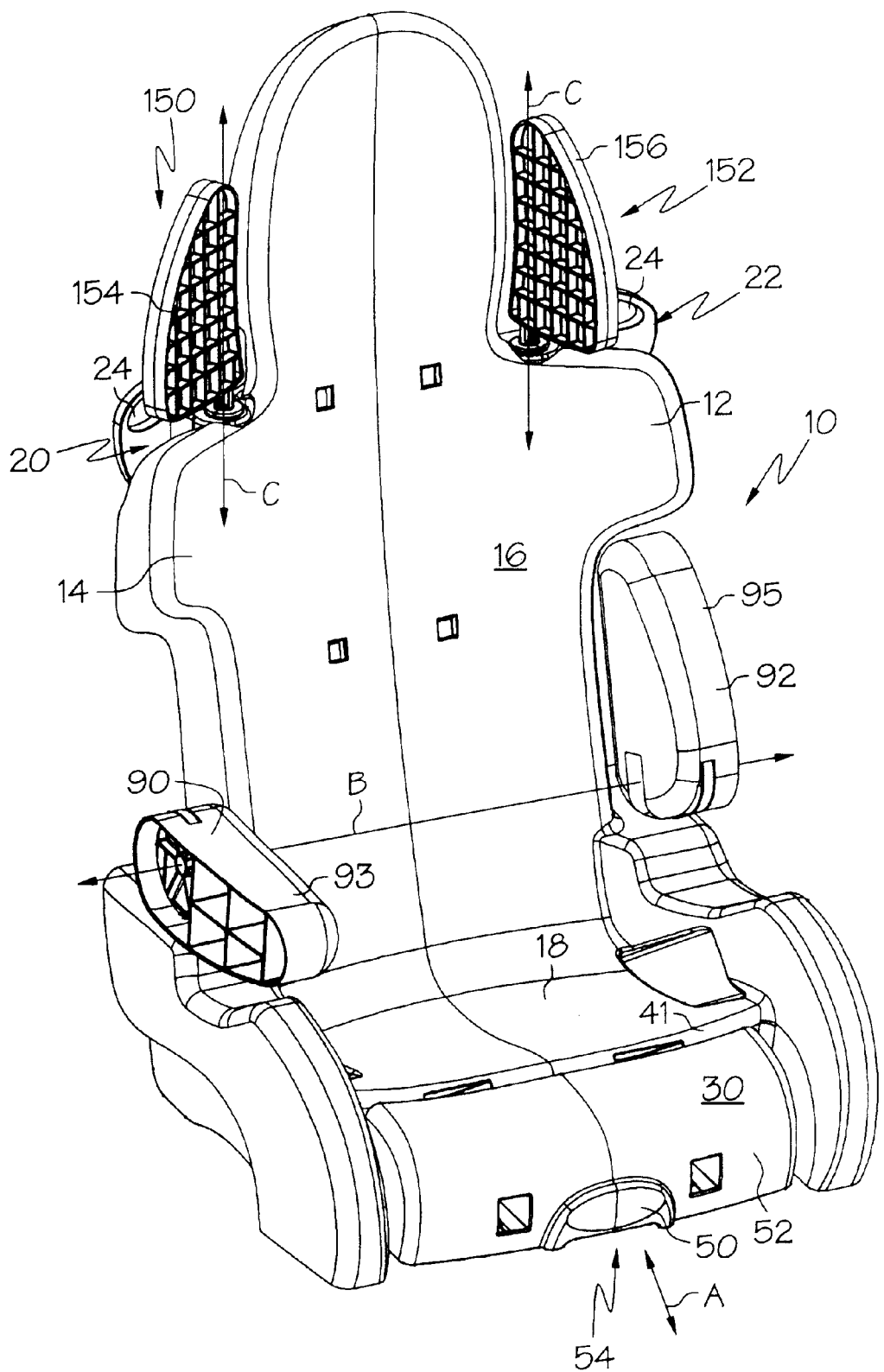
FIG. 1 is front perspective view of the inner shell of one embodiment of the booster seat of the present invention.

As shown in FIG. 1, in one embodiment a booster seat, generally designated 10, includes a seat shell, generally designated 12. The shell 12 includes a body 14 which has a seat back 16 and a seat pan 18 for supporting an occupant thereon. The shell 12 may be a piece of molded, relatively rigid polymer material, and the shell 12 typically includes a plurality of cushioned coverings or soft goods (not shown) located thereon to provide comfort to the occupant.

The shell 12 may include a pair of belt guides 20, 22 located thereon, although the shell may include only a single belt guide. The belt guides 20, 22 are preferably located on opposite sides of the seat back 16, and each belt guide 20, 22 defines a slot 24 to receive the belt (not shown) of a vehicle therethrough. As will be discussed in greater detail below, the belt guides 20, 22 may be attachable to the seat back 16 at various vertical locations such that the slots 24 can be located at the desired height to guide the vehicle belt over the torso of an occupant in the desired manner.

Figure 2:
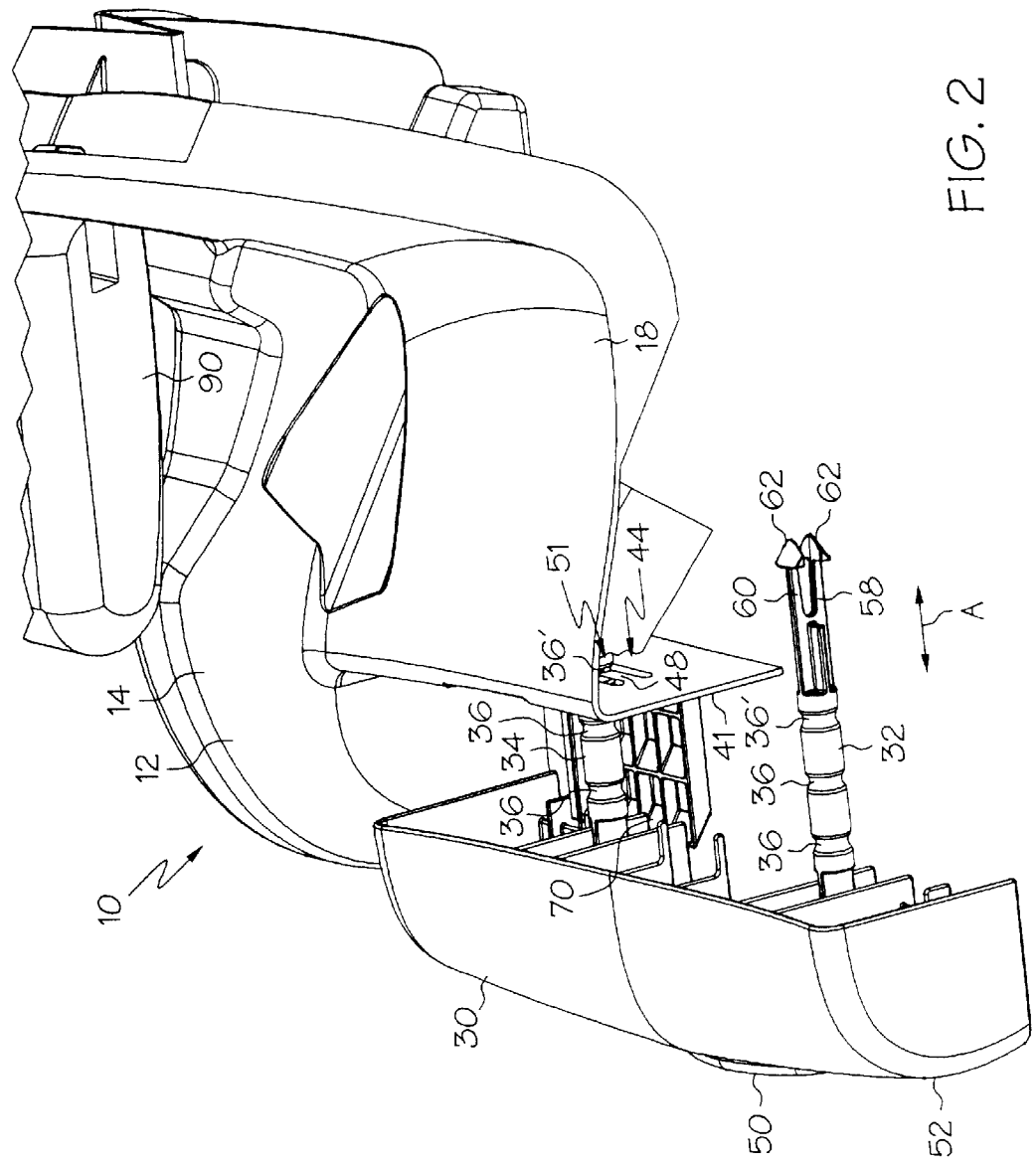
FIG. 2 is a side perspective partial cut-away detail view of the shell of FIG. 1.
Figure 3:
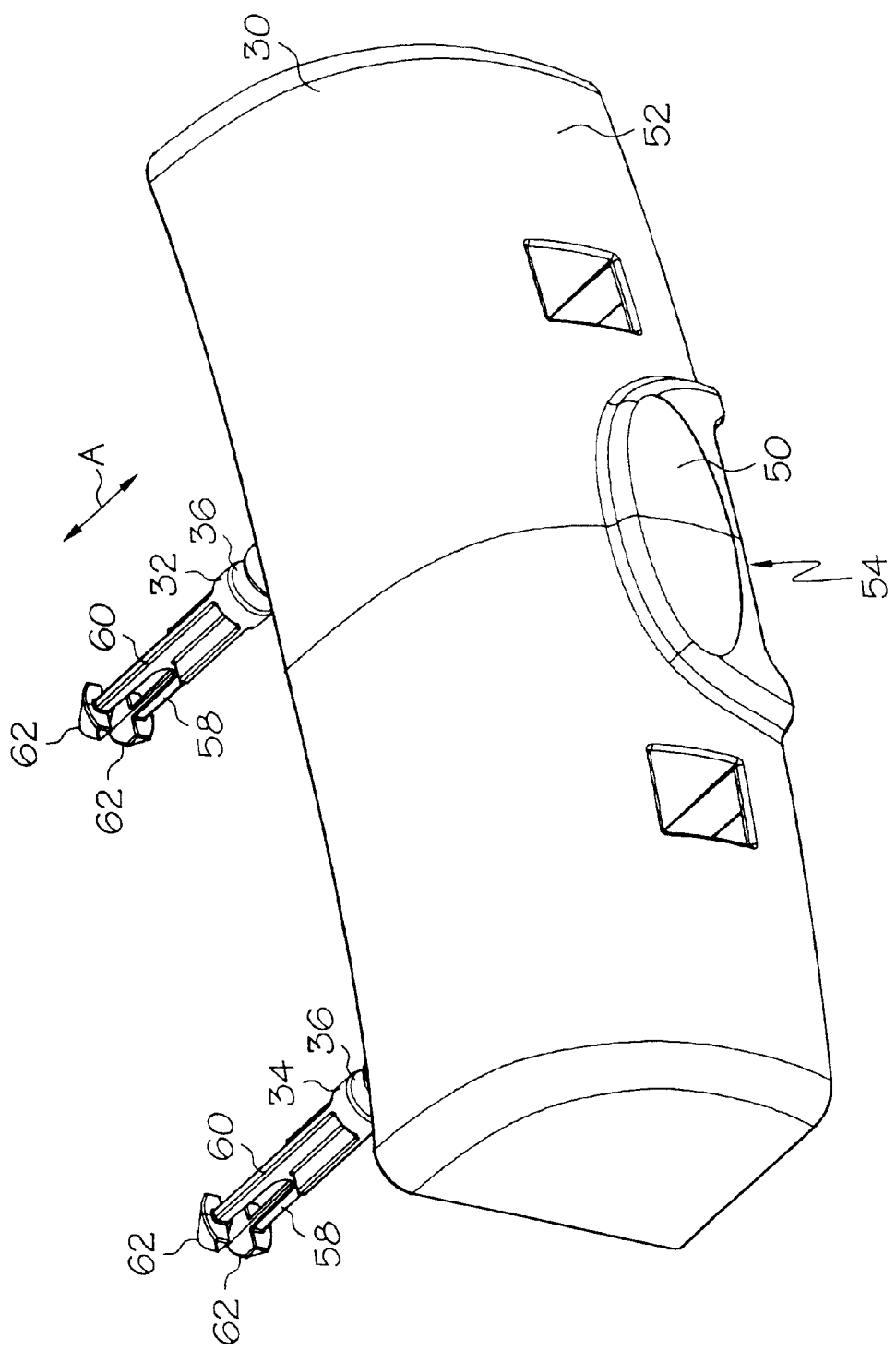
FIG. 3 is a front perspective view of the thigh support of the shell of FIG. 1.
Figure 5:
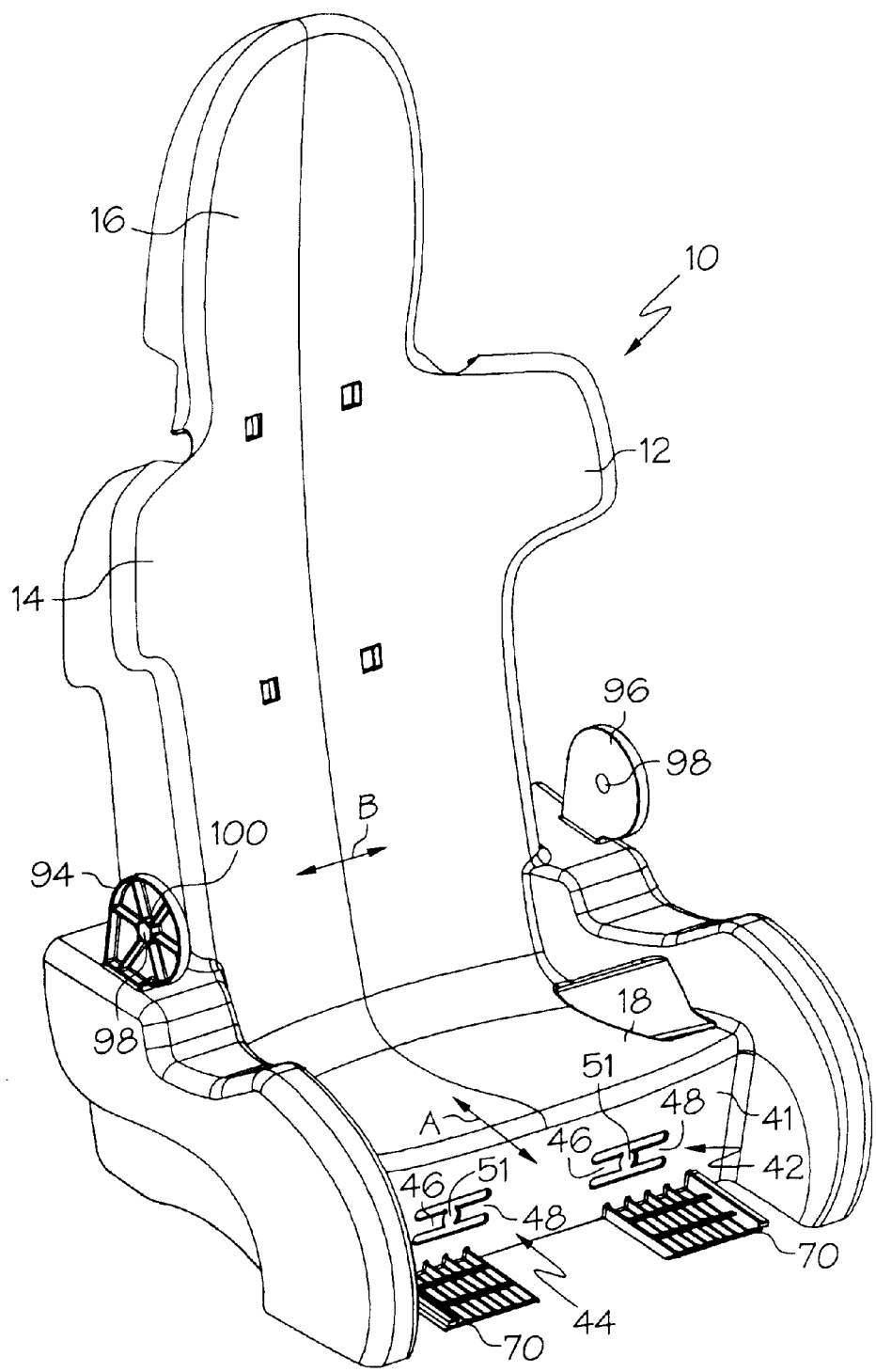
FIG. 5 is a front perspective view of the shell of FIG. 1 with the head rests, arm rests, and thigh support removed.

The seat 10 may include an adjustable thigh support 30 that is movably coupled to the seat pan 18. As shown in FIG. 2, the thigh support 30 may include a pair of support members or rods 32, 34 extending generally outwardly therefrom, with each rod 32, 34 having a plurality of circumferential grooves 36 formed thereon. The seat pan 18 may include a pair of gripping portions 42, 44 located on a front surface 41 thereof (FIG. 5). Each gripping portion 42, 44 may include a pair of opposed cantilevered seat pan tabs 46, 48 that are spaced apart to define a center opening 51 therebetween which can slidably receive an associated one of the rods 32, 34 therethrough. The tabs 46, 48 are located to be simultaneously received in opposite sides of one of the grooves 36 to lock the thigh support 30 in place relative to the seat pan 18. For example, as shown in FIG. 2, the tabs 46, 48 (only one of which is shown in FIG. 2) of the gripping portion 44 are received in the groove 36' to lock the thigh support 30 in place relative to the seat pan 18. Of course, the tabs 46, 48 of the gripping portion 42 (not shown in FIG. 2) are also preferably simultaneously received in an associated groove 36' of the rod 32.

Figure 4:
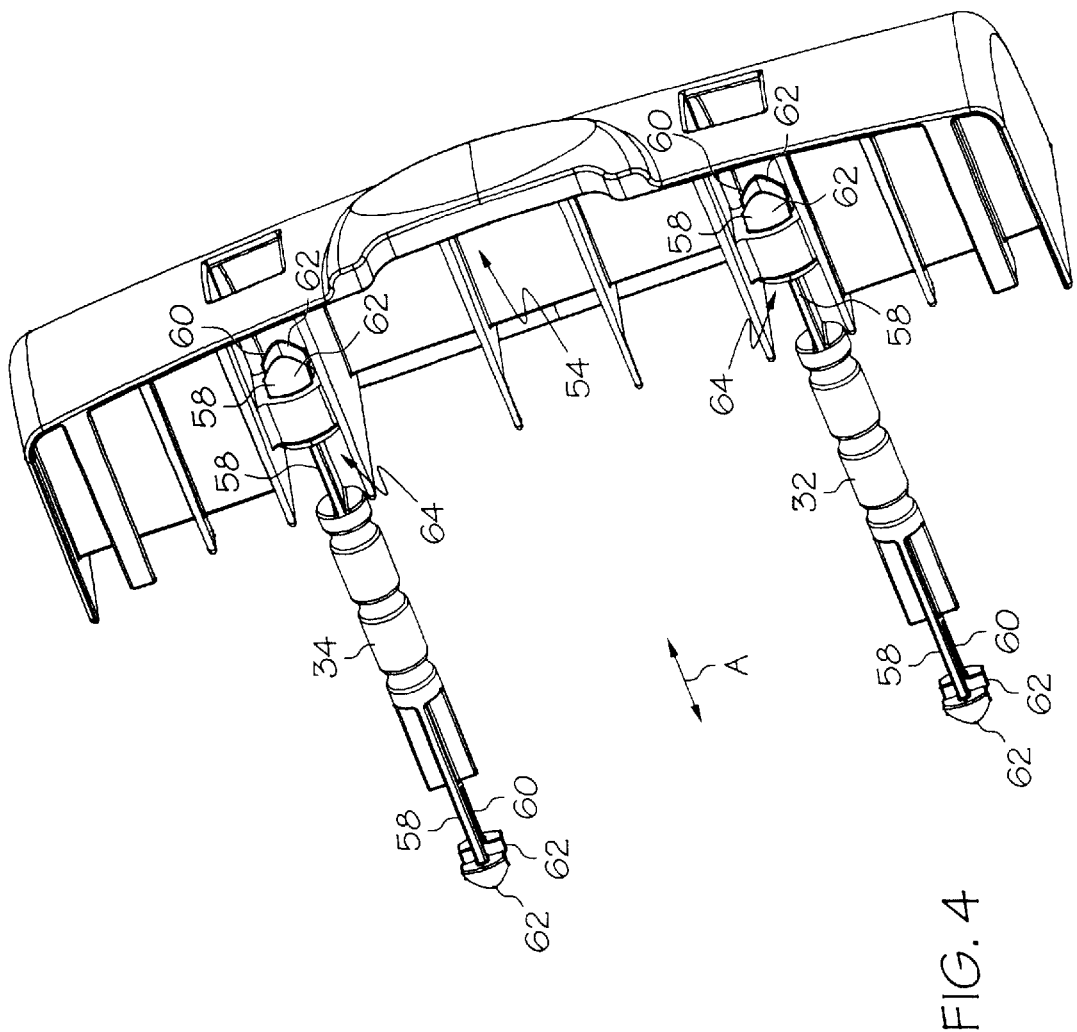
FIG. 4 is a bottom perspective view of the thigh support of FIG. 3.

The thigh support 30 may include a protruding handle portion 50 located on a front surface 52 thereof, the handle portion 50 defining a hand-receiving groove 54 located behind the front surface 52 (see FIG. 4). In this manner, a user can grip the handle portion 50 by sliding the user's fingers behind the handle portion 50 and into the hand-receiving groove 54 to grip the thigh support 30 to move the thigh support 30 closer to or further away from the seat pan 18. In this manner, the thigh support 30 may be moved along axis A which extends across the depth of the car seat 10 between a retracted position, wherein the thigh support 30 is located adjacent to the seat pan 18 (FIG. 1), and any one of an extended position wherein the thigh support 30 is spaced away from seat pan (see, e.g., FIG. 2). In each of the extended positions, as well as the retracted position, the tabs 46, 48 of each gripping portion 42, 44 are received in one of the sets of grooves 36 to retain the thigh support 30 in place. The thigh support 30 can be moved to a different position by pushing or pulling on the thigh support 30 with force sufficient to urge the tabs 46, 48 out of the corresponding grooves 36. The thigh support 30 is then slid closer to or further away from the seat pan until the tabs 46, 48 of each gripping portion 42, 44 are received in a groove 36 to retain the thigh support 30 in place.

As best shown in FIG. 4, each rod 32, 34 may include a pair of opposed cantilevered coupling prongs 58, 60 located at each end thereof, each coupling prong 58, 60 having a tapered coupling tip 62 located at an end thereof (also see FIG. 2). In order to couple each rod 32, 34 to the thigh support 30, the tips 62 of one set of coupling prongs 58, 60 are placed into an opening 64 in the thigh support 30, and the coupling prongs 58, 60 are pushed into the associated opening 64. As the coupling prongs 58, 60 are urged into the opening 64, the outer angled surfaces of the tips 62 engage the surfaces of the opening 64, which presses the tips 62 together so that the tips can pass through the associated opening 64. Once the tips 62 are passed through and emerge on the other side of the opening 40, the tips 62 spring apart to thereby lock the rod 32, 34 to the thigh support 30.

Similarly, in order to couple the thigh support 30 to the seat pan 18, an end of each rod 32, 34 can be passed through the opening 51 of one of the gripping portions 42, 44 such that the tips 62 are received through the openings 51 of the body 14 in a manner similar to that described above for coupling the rods 32, 34 to the thigh support 30.

As best shown in FIGS. 2 and 5, the seat pan may include a pair of protection panels 70 coupled to and located generally below the thigh support 30. The protection panels 70 may be coupled to and extend generally outwardly from the seat pan 18 to provide support to the thigh support 30 when the thigh support 30 is located in one of its extended positions. The protection panels 70 may also protect the vehicle seat upon which the booster seat 10 is located by spacing the thigh support 30 from the vehicle seat.

Although the illustrated booster seat 10 includes a pair of coupling rods 32, 34 and corresponding openings 51, the booster seat 10 may also include only a single coupling rod and opening, or more than two coupling rods and openings. Furthermore, although the coupling rods 32, 34 are disclosed as being fixedly coupled to the thigh support 30 and slidable relative to the seat pan 18, the rods 32, 34 may instead be fixedly coupled to the seat pan 18 and the thigh support 30 may include the gripping portions 42, 44 located thereon. The rods 32, 34 need not have a circular cross section, and can be of nearly any other desired shape. Of course, the openings 51 are preferably shaped to correspond to the shape of the rods 32, 34.

The adjustable thigh support 30 enables the thigh support 30 to move outwardly such that the thigh support 30 can be located at a desired extended position. For example, it may be desired to have the thigh support 30 located at an outer end of the thigh of an occupant (that is, located immediately adjacent to the crook of the knee of an occupant), and the adjustable thigh support 30 enables the booster seat to accommodate differently-sized occupants. The thigh support 30 can also enable the booster seat 10 to assume a compact condition when the thigh support 30 is in its retracted position.

Figure 6:
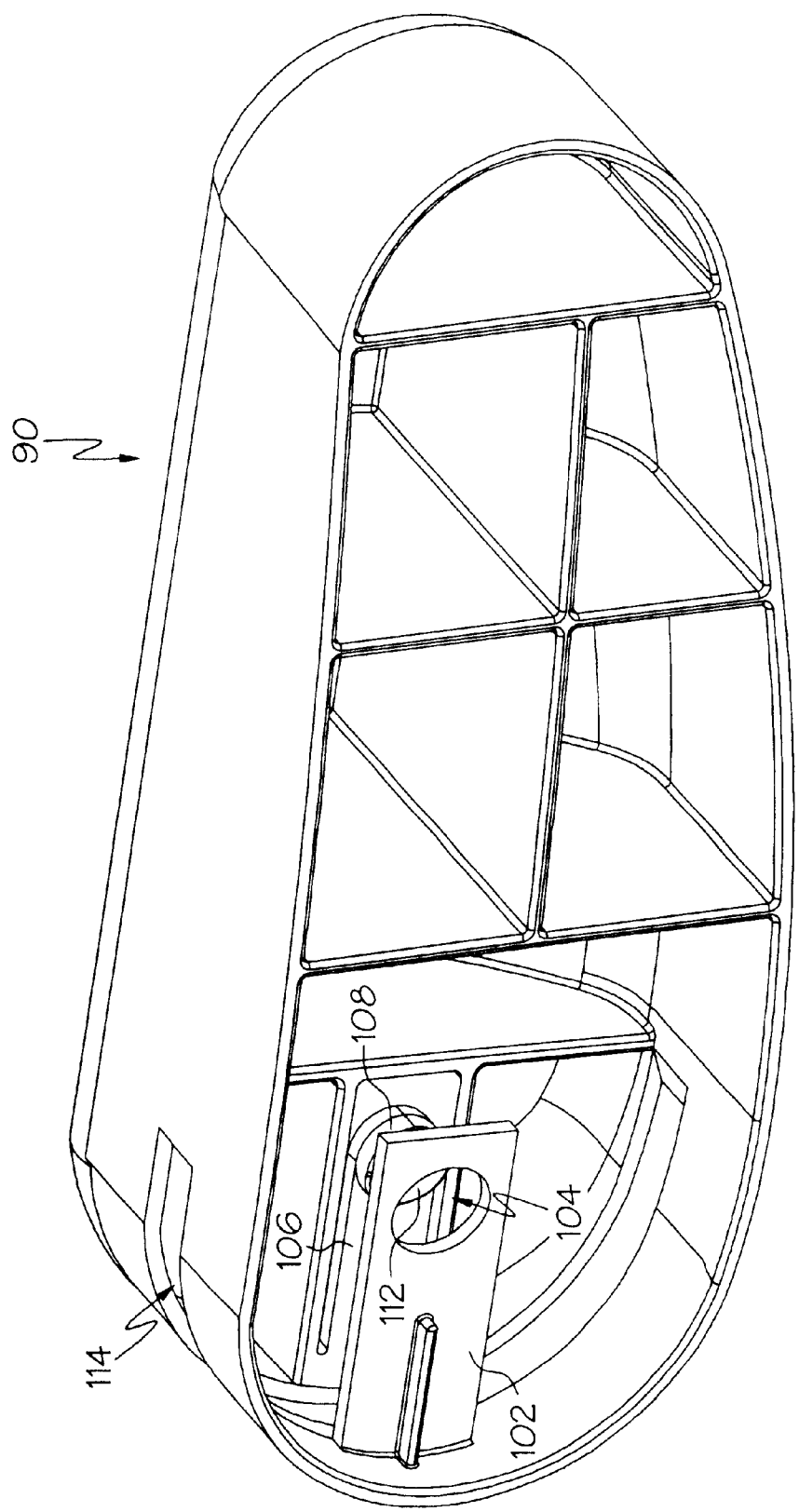
FIG. 6 is a side perspective view an arm rest of the seat shell of FIG. 1.
Figure 7:
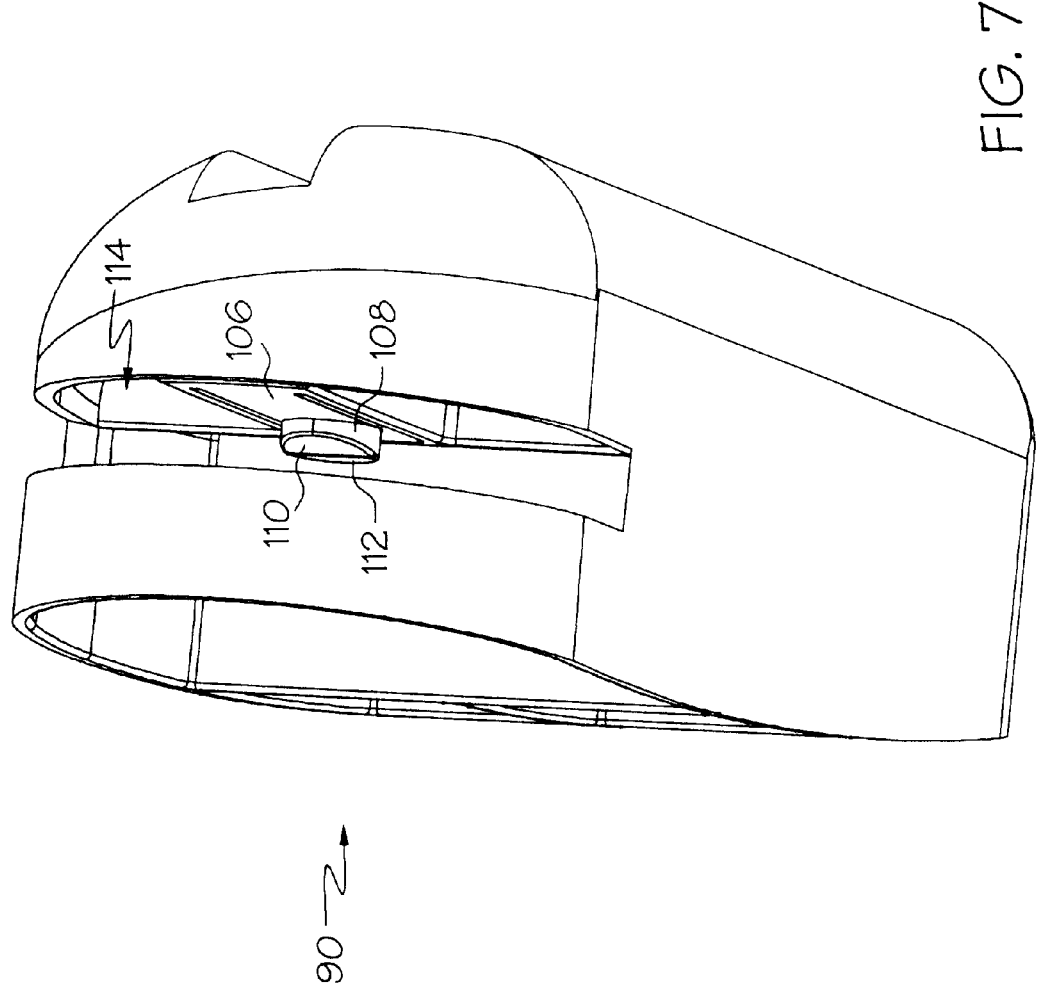
FIG. 7 is a rear perspective view of the arm rest of FIG. 6.

As shown in FIG. 1, the booster seat 10 may include a pair of adjustable arm rests 90, 92 coupled to, and located on opposite sides of, the body 14. As shown in FIG. 5, the body 14 may include a pair of brackets 94, 96 located on opposed sides of the body 14, with each bracket 94, 96 having a generally circular bracket opening 98 formed therein. Each bracket 94, 96 may include a generally cylindrical portion 100 which defines at least part of the associated bracket opening 98. FIG. 6 illustrates the arm rest 90, with the arm rest 92 being substantially identical but a mirror image thereof. The arm rest 90 may include a cantilevered flange 102 having a generally circular arm rest opening 104 formed therein. The arm rest 90 may also include a cantilevered stub flange 106 having a generally cylindrical stub 108 located at an end thereof. As shown in FIG. 7, the stub 108 may include a tapered surface 110 located adjacent to the flat end 112 of the stub.

In order to attach the arm rest 90 to the bracket 94, the arm rest 90 is positioned such that the bracket 94 is received between the flange 102 and the stub flange 106. As shown in FIGS. 6 and 7, the arm rest 90 may include a rear slot 114 which receives a rear portion of the arm rest bracket 94 therein. The arm rest 90 is then slid over the bracket 94 until the stub 108 is received in the bracket opening 98. The tapered surface 110 of the stub 108 guides the stub 108 into the bracket opening 98, and the stub flange 106 may flex outwardly to enable the stub 108 to be urged into the bracket opening 98.

Figure 8:
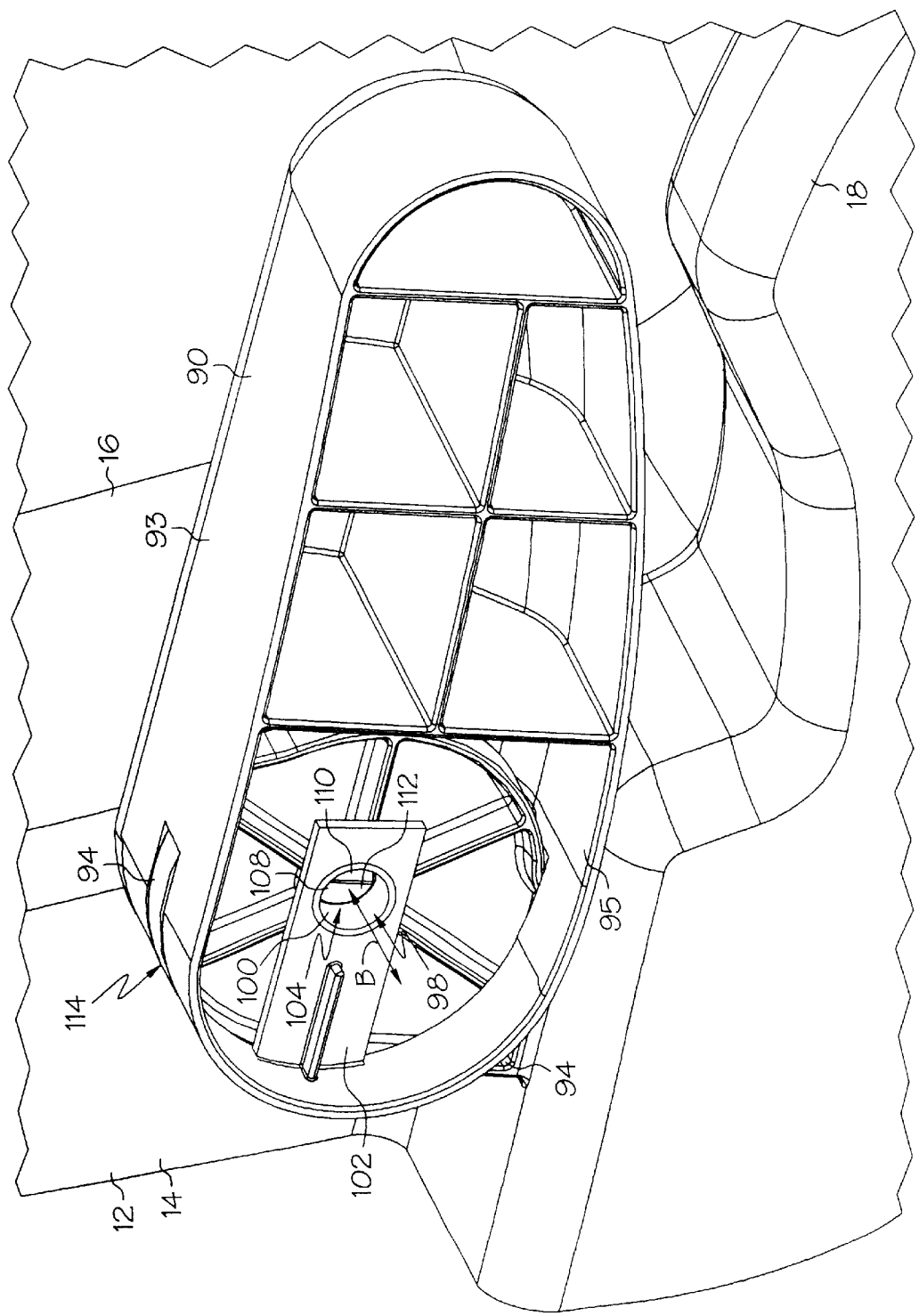
FIG. 8 is a detail side perspective view of the arm rest of the seat shell of FIG. 1.

As shown in FIG. 8, when the stub 108 is received in the bracket opening 98, the generally cylindrical portion 100 of the bracket 94 is simultaneously received in the arm rest opening 104. The flange 102 may flex outwardly to enable the cylindrical portion 100 to be received in the arm rest opening 104. In this manner, the stub 108 can be received in the bracket opening 98 and the cylindrical portion 100 can be simultaneously received in the arm rest opening 104 to pivotally couple the arm rest 90 to the bracket 94 and body 14 (see FIG. 8).

Once mounted to the associated bracket 94, 96, each arm rest 90, 92 may be pivotable about an axis B which extends generally transversely across the body 14. For example, FIG. 1 illustrates arm rest 90 in its extended position (wherein the arm rest 90 is generally perpendicular to the seat back 16) and arm rest 92 in its retracted position (wherein the arm rest 92 is generally flush with the seat back 16). When the arm rests 92 are in the retracted positions, they may protrude slightly forwardly from the seat back 16 to help retain the occupant in the car seat 10.

Figure 9:
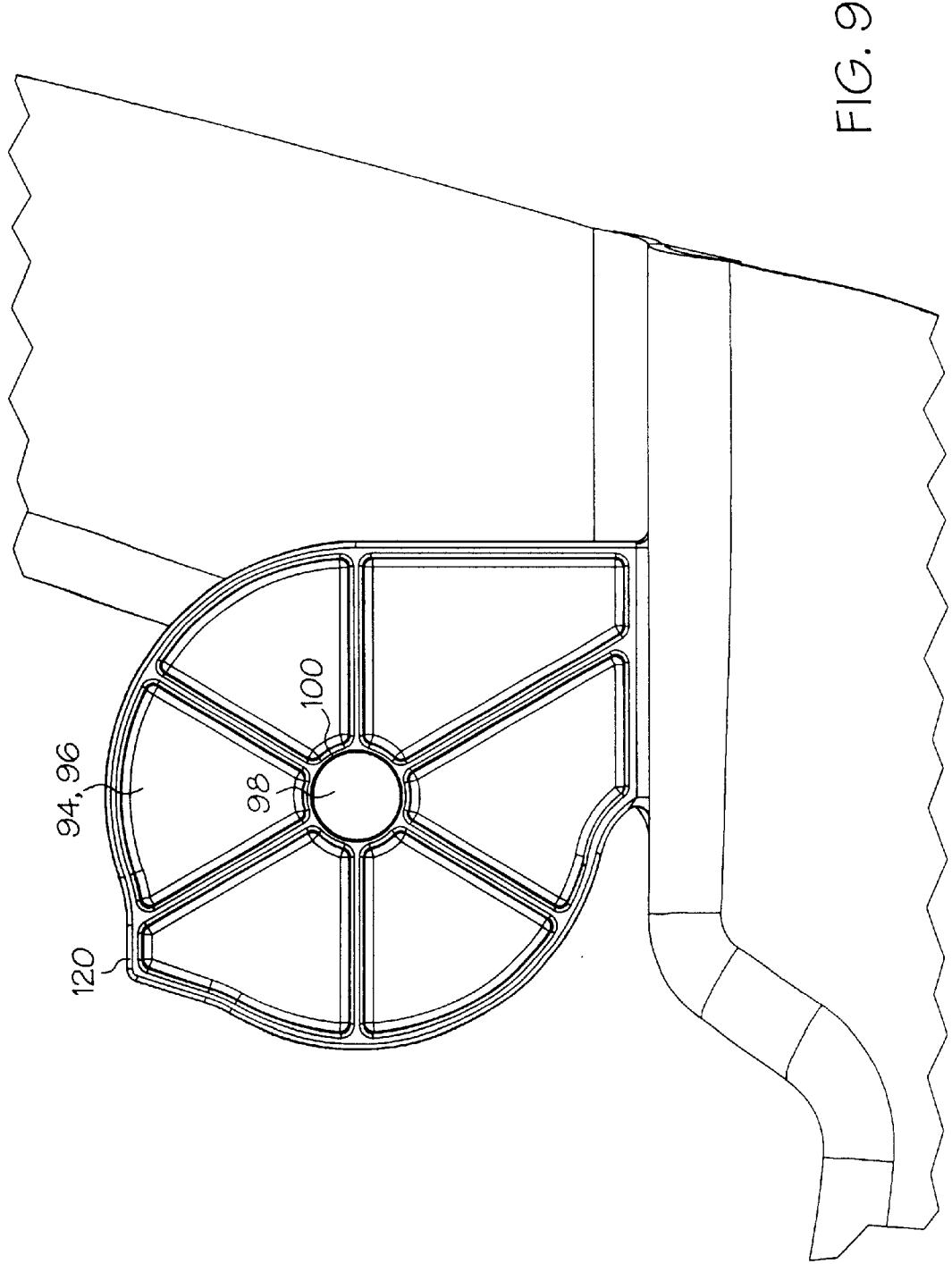
FIG. 9 is a side view of an alternate embodiment of a seat bracket of the seat shell of FIG. 1.
Figure 9A:
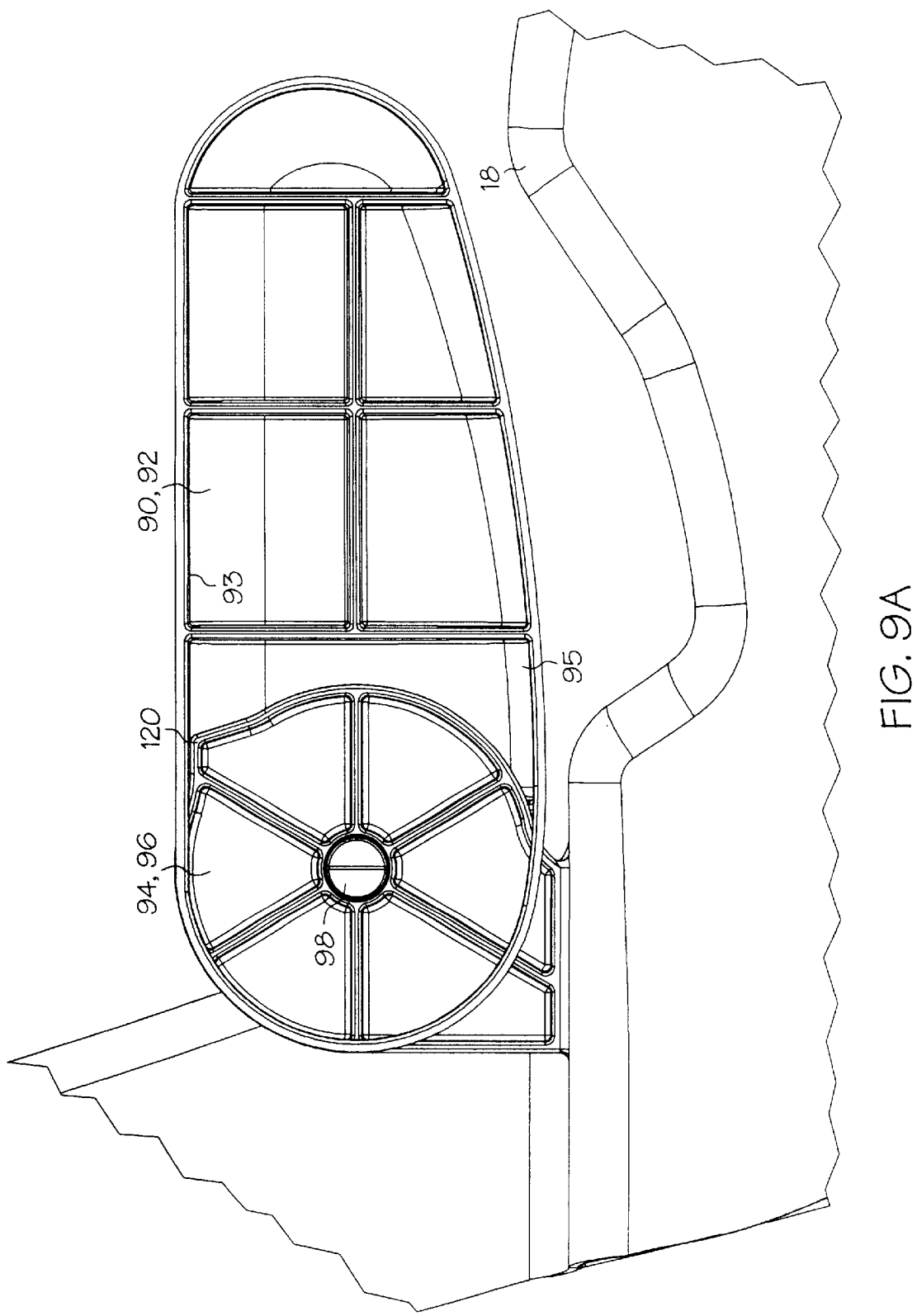
FIG. 9A is a side cross section of an arm rest coupled to the seat bracket of FIG. 9, with the arm in its extended position.
Figure 9B:
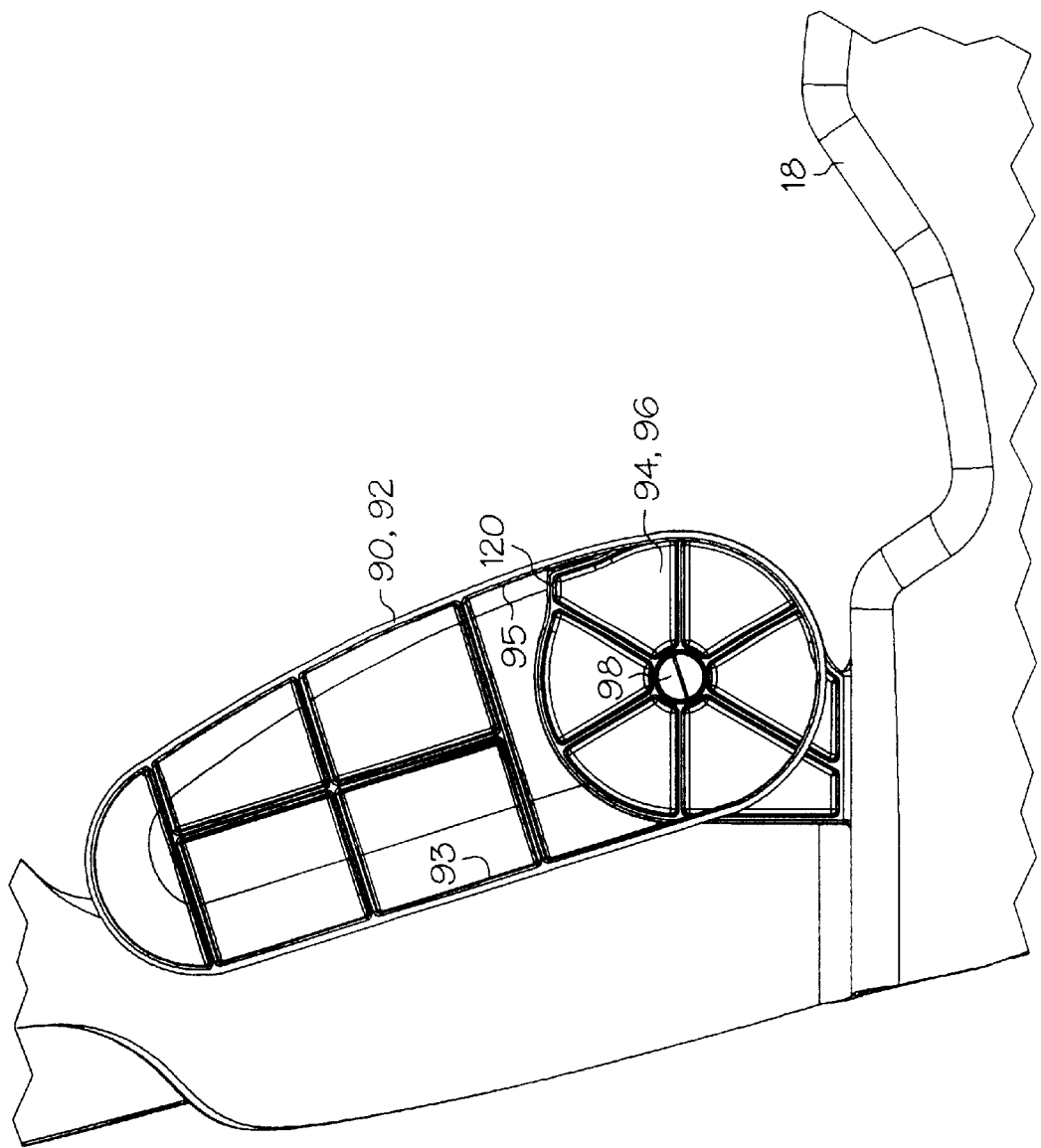
FIG. 9B is a side cross section of an arm rest coupled to the seat bracket of FIG. 9, with the arm in its retracted position.

As shown in FIG. 9, the arm rest brackets 94, 96 may include a stop surface or protrusion 120 that extends generally outwardly from the circular outer surface of the bracket 94, 96. The protrusion 120 can serve as a stop to limit the pivoting motion of the associated arm rest 90, 92. For example, as shown in FIG. 9A, the upper surface 93 of the arm rest 90, 92 may engage the protrusion 120 when the arm rest 90, 92 is in its extended position. As shown in FIG. 9B, the lower surface 95 of the arm rest 90, 92 may engage the protrusions 120 when the arm rest 90, 92 is in its retracted position. In this manner, the protrusion 120 can limit the pivoting range of each arm rest 90, 92 to about 110° (that is, limit the pivoting motion of the arm rests 90, 92 to motion between the extended and retracted positions).

Figure 10:
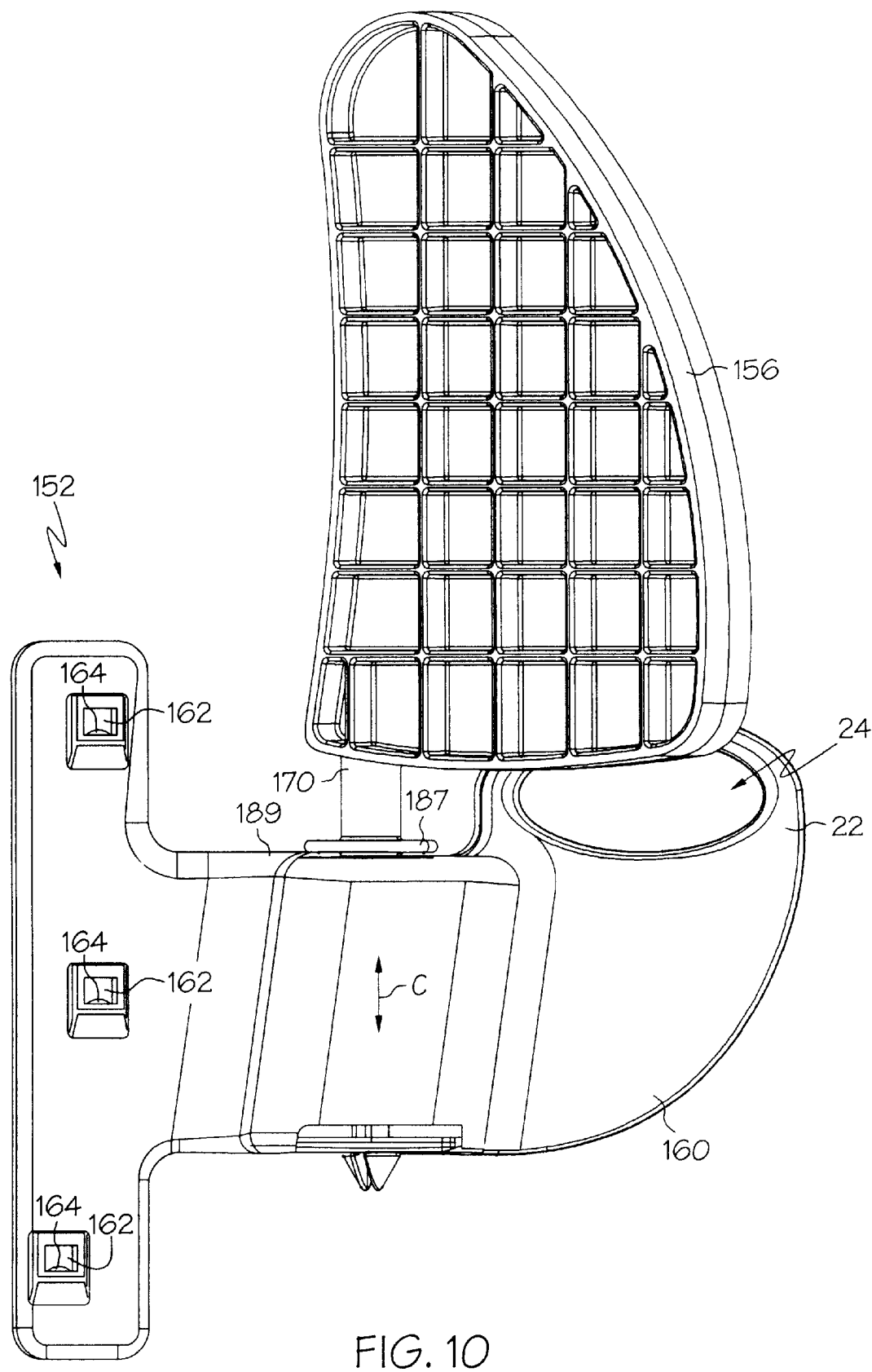
FIG. 10 is a rear view of a head rest assembly.

As shown in FIG. 1, the booster seat 10 may include a pair of head rest assemblies 150, 152 coupled to the seat back 16, each head rest assembly 150, 152 including a head rest 154, 156. FIG. 10 illustrates head rest assembly 152 (with head rest assembly 150 being substantially identical but a mirror image thereto) that can be coupled to the body 14. The head rest assembly 152 includes a head rest base 160 including a set of three vertically spaced attachment points 162, each attachment point including an opening 164. The body 14 may include a pair of columns of generally vertically-extending openings (not shown), each column of openings extending along an outer edge seat back 16. In order to couple the head rest assembly 152 to the seat back 16, the head rest assembly 152 is placed against the seat back 16 such that each of the attachment points 164 is aligned with an opening on the seat back 16. A fastener can be passed through each of the aligned openings of the head rest assembly 152 and seat back 16 to secure the head rest assembly 152 to the seat back 16 at the desired height.

The head rest base 160 may include a belt guide 22 defining a slot 24 therein for receiving a vehicle belt therethrough. The head rest assembly 152 may also include a generally triangular-shaped head rest 156 coupled to the head rest base 160. The head rest 156 may include a generally downwardly extending rod 170 that is received in the head rest base 160 to pivotally couple the head rest 156 to the head rest base 160. The head rest 156 may include a collar 187 located on the rod 170. The head rest 154 is substantially identical to the head rest 156.

Each head rest 154, 156 is located at opposed sides of the body 14 and is pivotable about an axis C which extends generally along the height of the body 14 (see FIG. 1). Each head rest 154, 156 may be pivotable between a retracted position (head rest 154 of FIG. 1) wherein the head rest is generally flush with the seat back 16, and an extended position (head rest 156 of FIG. 1) wherein the head rest forms an angle with the seat back 16.

Figure 11:
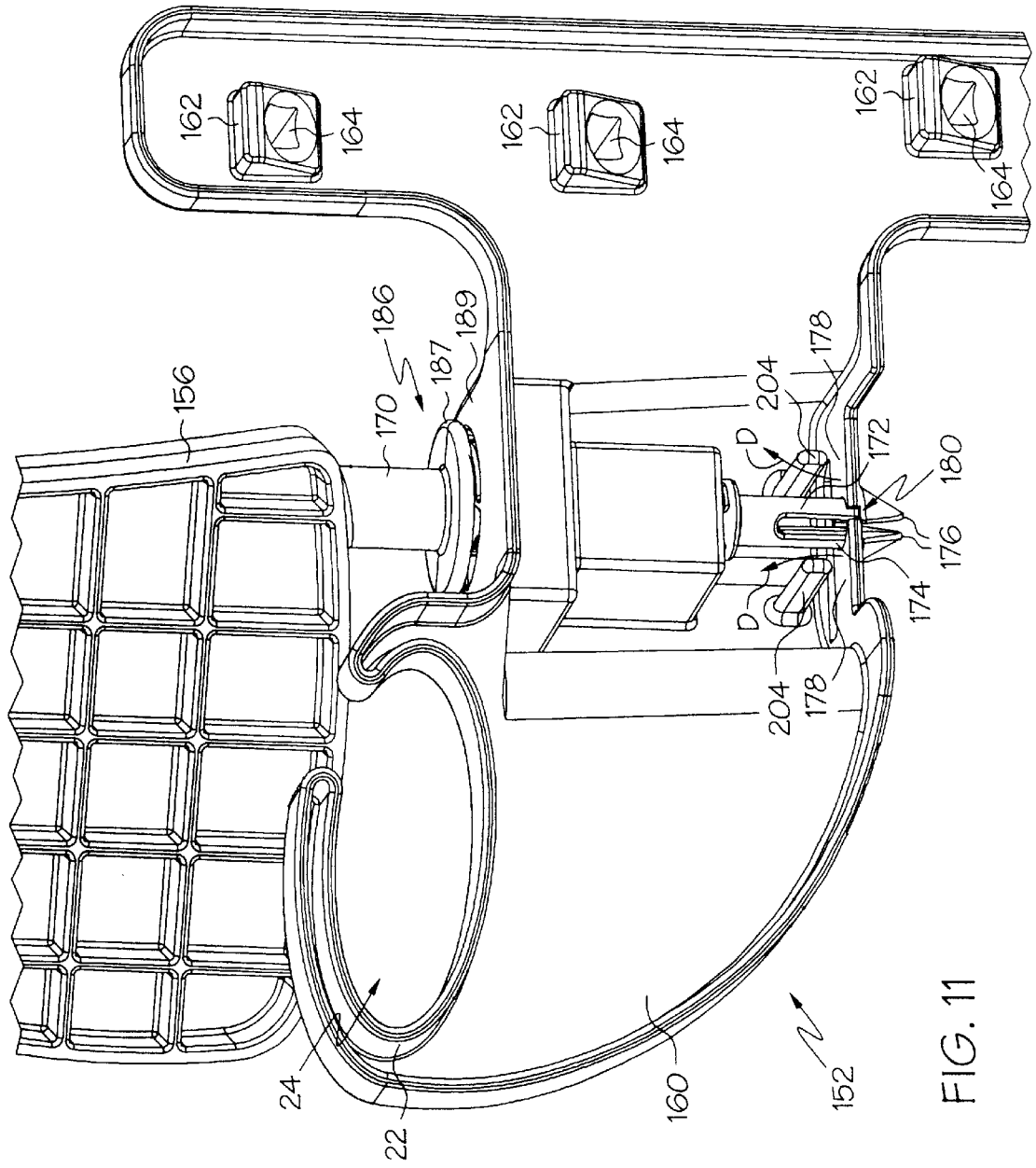
FIG. 11 is a detail front view of the head rest assembly of FIG. 10.

As shown in FIG. 11, the rod 170 of head rest 156 may include a pair of cantilevered coupling prongs 172, 174 and its lower end, with each coupling prong 172, 174 including a generally tapered tip 176. The head rest base 160 may include a pair of opposed cantilevered retaining tabs 178 defining an opening 180 therebetween. In order to couple the rod 170 to the head rest base 160, the tips 176 of each coupling prong 172, 174 are located in the opening 180, and the rod 170 and head rest 156 are urged downwardly, which urges the tips 176 together so that the tips 176 can fit through the opening 180. Once the tips 176 emerge on the opposite side of the opening 180, the tips 176 spring apart to couple the rod 170 and head rest 156 to the head rest base 160. The retaining tabs 178 and tips 176 may be shaped and located such that after the head rest 156 is coupled to the head rest base 160, the retaining tabs 178 pull the rod 170 and head rest 156 generally downwardly; in other words, once the coupling flanges 172, 174 are pushed through the opening 180, the coupling flanges 172, 174 and tips 176 may pull the retaining tabs 178 slightly upwardly in the direction of arrow D, as will be discussed in greater detail below.

Figure 12:
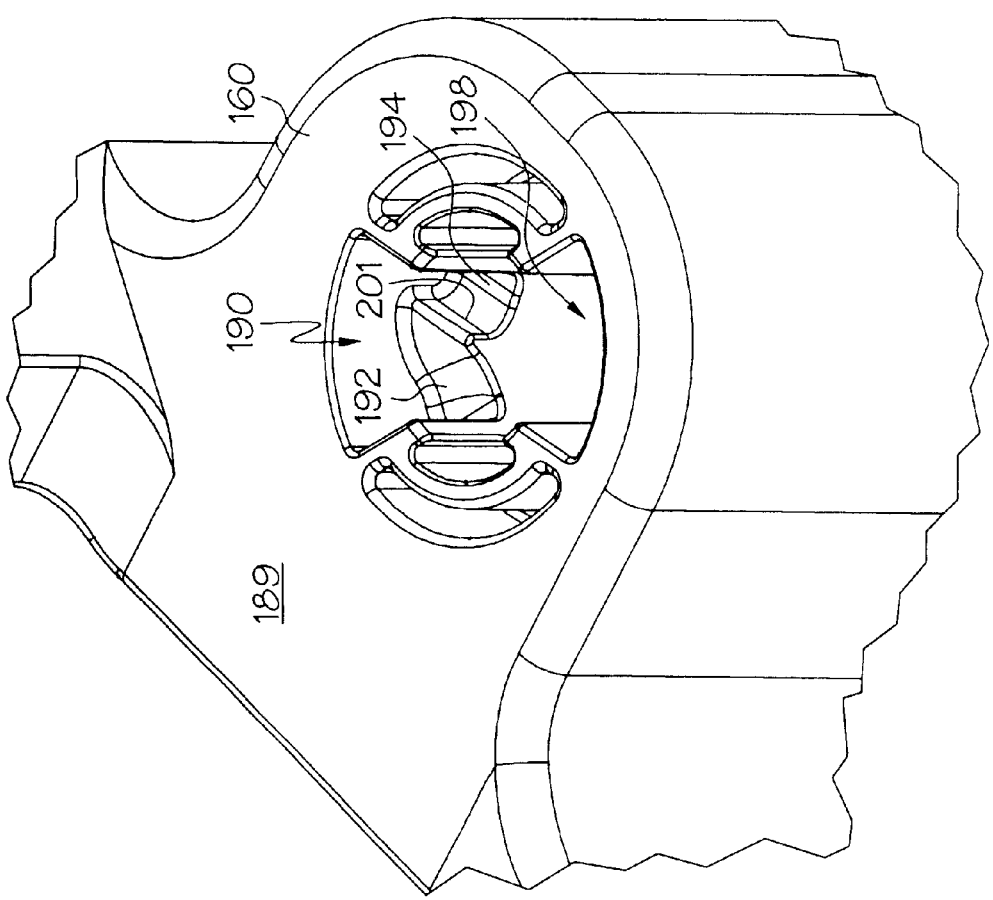
FIG. 12 is a top perspective view of the recess of the head rest assembly of FIG. 10.
Figure 13:
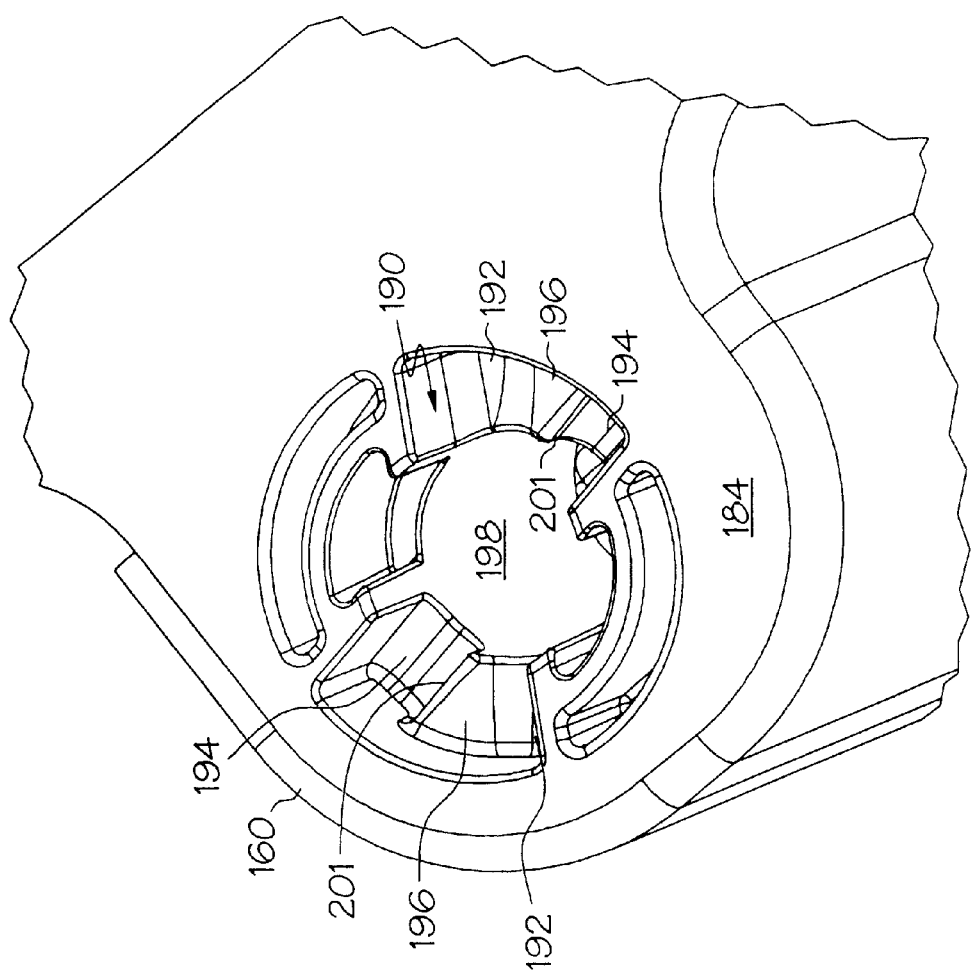
FIG. 13 is another top perspective view of the recess of the head rest assembly of FIG. 10.
Figure 14:
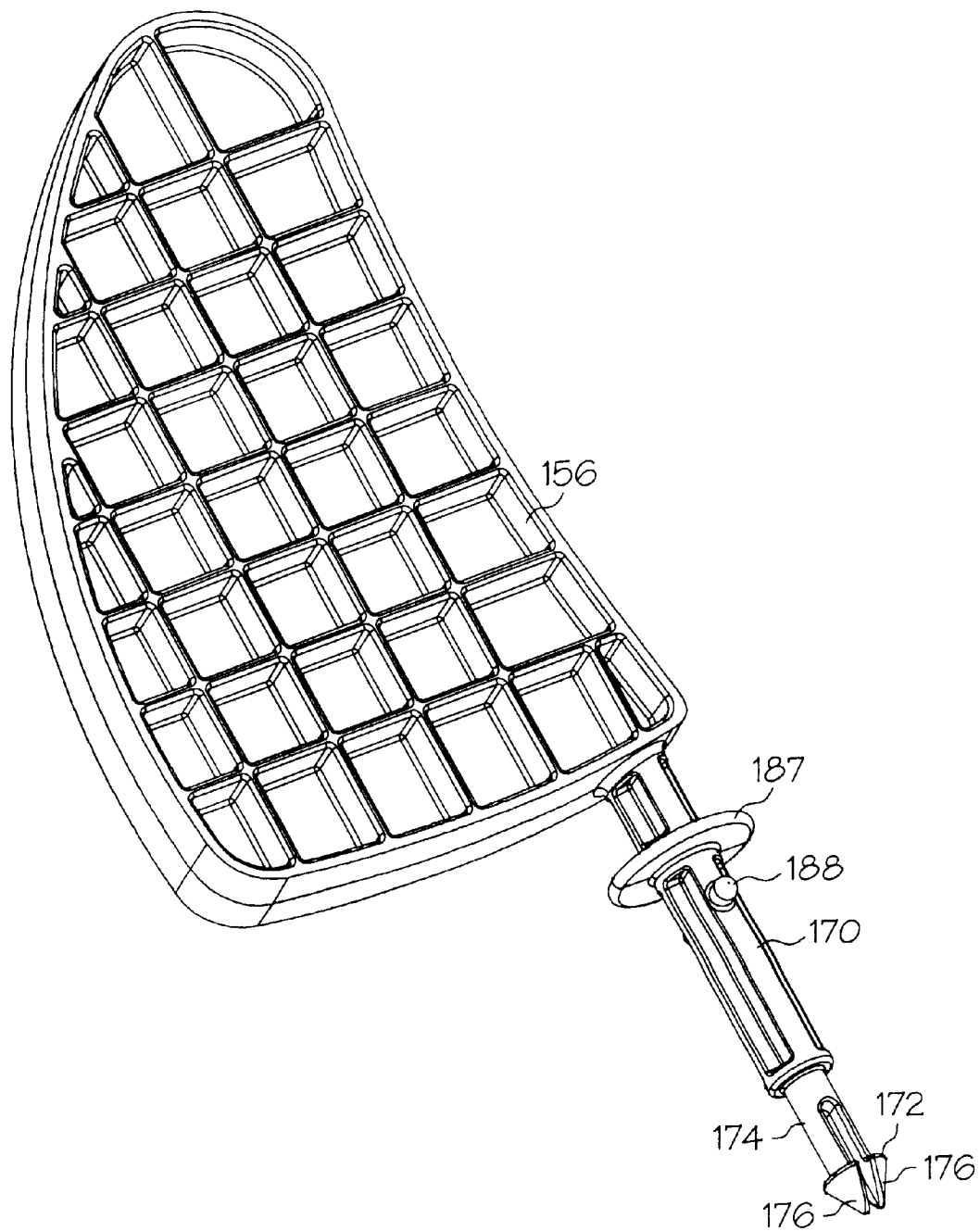
FIG. 14 is a front perspective view of a head rest.

The head rest assembly 152 may include a retaining mechanism, generally designated 186, that can maintain the head rest 156 in its retracted and extended position. As shown in FIG. 14, the retaining mechanism 186 may include a pin 188 that is coupled to, and extends generally transversely to, the rod 170 of the head rest 156. The pin 188 preferably protrudes from both sides of the rod 170, and is shaped and located to be received in a recess 190 formed in the head rest base 160 (see FIGS. 12 and 13). The recess 190 may include a central opening 198, a pair of opposed upper plateau portions 192 and a pair of opposed lower plateau portions 194. Each upper plateau portion 192 may be located slightly above the associated lower plateau portion 194. The recess 190 may further include a pair of ramps 196, with each ramp 196 being located between an associated upper 192 and lower 194 plateau portion.

Figure 15:
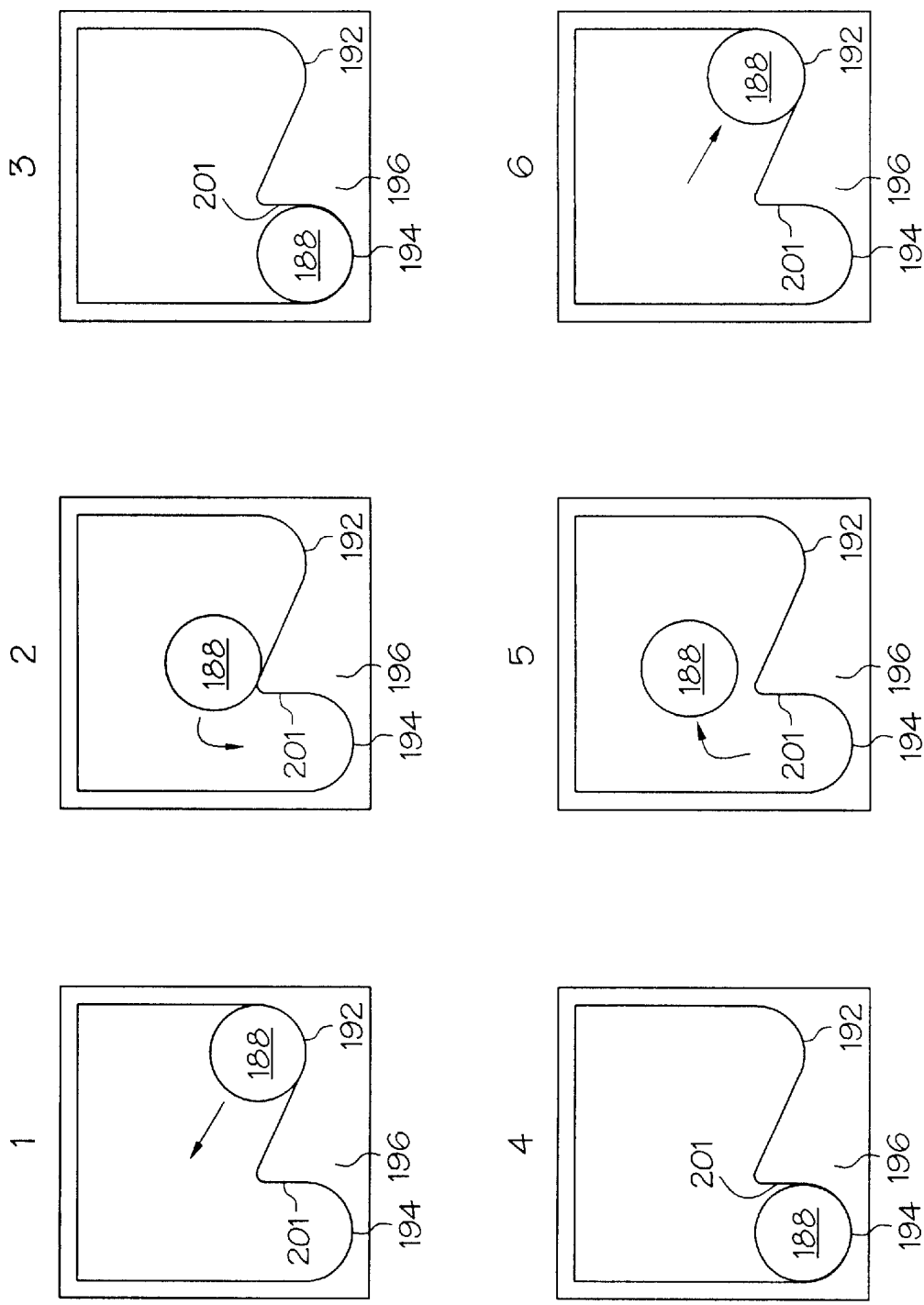
FIG. 15 is a series of schematic side views illustrating the operation of the head rest assembly of FIG. 10.
Figure 16:
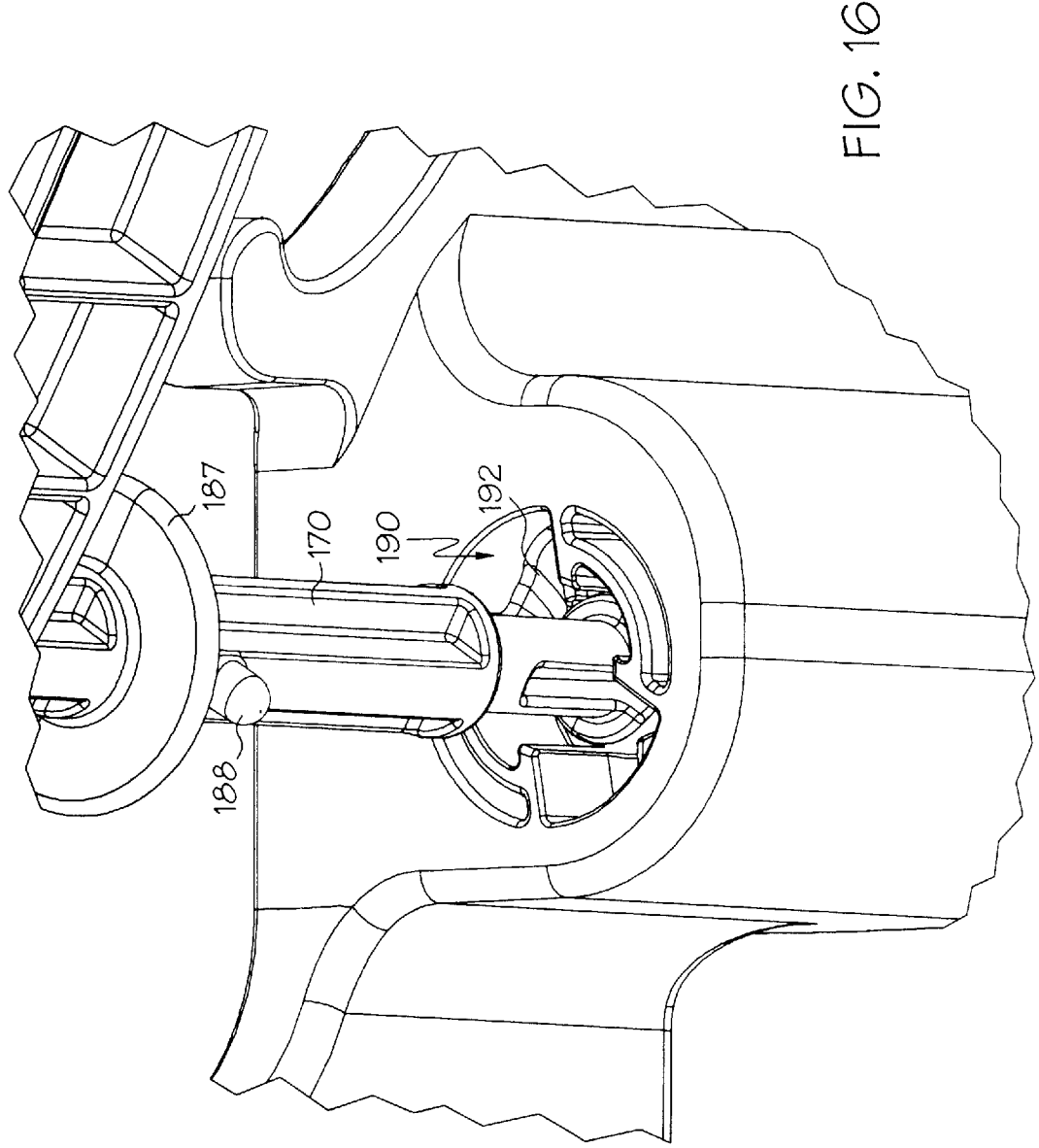
FIG. 16 is a perspective view of the head rest of FIG. 14 partially received in the recess of FIG. 12.

In order to mount the head rest 156 to the associated base 160, the head rest 156 is placed into the head rest base 160 such that the rod 170 is passed through the central opening 198 (see FIG. 16). The head rest 156 is then lowered through the central opening 198 until the pin 188 engages one or more of the plateau portions 192, 194 or ramps 196 and the collar 187 is seated on an upper flat surface 189 of the base 160. When the head rest 156 is located in its retracted position, opposite sides of the pin 188 are located on each of the upper plateau portions 192. This position is schematically illustrated in FIG. 15 as position 1 (with only one end of the pin 188 being shown). In order to pivot the head rest 156 to its extended position, the head rest 156, rod 170 and pin 188 are pivoted about axis C such that the pin 188 rides up each of the ramp portions 196, as shown in position 2 of FIG. 15. As the pin 108 rides up the ramps 196, the tips 176 of the rod are raised generally upwardly, which then pulls the retaining tabs 178 generally upwardly in the direction of arrows D in FIG. 11. Accordingly, if the head rest 156 is pivoted only partially to its extended position (as shown in position 2 of FIG. 15) and the head rest 156 is then released, the head rest 156 will return to its retracted position (i.e., position 1 of FIG. 15) as pulled by the retaining tabs 178.

Upon sufficient rotation of the head rest 156, the pin 188 clears the ramps 196 and snaps into position on the lower plateau portion 194, shown as position 3 in FIG. 14. In this position, the head rest 156 is securely retained in the extended position due to the interaction between the pin 188 and the generally vertically-extending face 201 of each ramp portion 196. In order to return the head rest 156 to its retracted position, the head rest 156 is gripped and lifted upwardly until the pin 188 clears the vertical face 201 of the ramp portions 196, as shown in position 5 of FIG. 15. As the head rest 156 and rod 170 are lifted, the coupling tabs 172, 174 bend the retaining tabs 178 upwardly in the direction of arrows D. The head rest body 160 may include a pair of limit bars 204 (FIG. 11) to limit the upward deflection of the retaining tabs 178. Once the head rest 156 and pin 188 are lifted sufficiently such that the pin 188 clears the vertical faces 201 of the ramps 196 (as shown in position 5 of FIG. 15), the head rest 156 may then be pivoted to its retracted position, as illustrated in position 6 of FIG. 15.

In this manner, the head rest 156 can be pivoted between its extended and retracted position, and is bi-stable. The size of the pin 188 and vertical face 201 may be selected such that when the head rest 156 is in its extended position the pin 188 can "ride up" and over the vertical face 201 and into its retracted position when sufficient rotational force is applied to the head rest 156 without being required to lift up the head rest 156. The configuration and operation of the head rest 154 is substantially identical to the head rest described and shown above for head rest 156. Furthermore, it should be understood that the shape and configuration of each ramp 196 may be reversed such that each head rest 154, 156 is moved from its retracted position to its extended position by the sequence illustrated in FIG. 15.

Having described the invention in detail and by reference to the preferred embodiments, it will be apparent that modifications and variations thereof are possible without departing from the scope of the invention.

What is claimed is:

1. A booster seat for being coupled to a vehicle seat and supporting a child occupant thereon comprising:
   a body including a seat back and a seat pan for supporting an occupant thereon;
   a seat belt guide coupled to said body for receiving a vehicle belt therethrough and guiding said vehicle belt over an occupant located on said body;

an adjustable thigh support coupled to said seat pan and being movable closer to or further away from said seat pan;

a pair of adjustable arm rests coupled to said body, each arm rest being located on opposed sides of said body and being pivotable about an axis that extends generally transverse to said body; and a pair of head rests coupled to said seat back, each head rest being located on opposed sides of said seat back and being pivotable about an axis that extends generally along the height of said body wherein said body includes a pair of brackets, each bracket having a bracket opening, and wherein each arm rest includes a stub fixedly and non-removably coupled to said arm rest, said stub being received in an associated bracket opening to pivotally couple the associated arm rest to the associated bracket.

2. The booster seat of claim 1 wherein each bracket opening is generally circular and each stub is generally cylindrical.

3. The booster seat of claim 2 wherein each bracket includes a protrusion and wherein each arm rest includes an arm rest opening shaped to receive one of said protrusions therein to pivotally couple the associated arm rest to the associated bracket.

4. The booster seat of claim 3 wherein each protrusion includes at least part of one of said bracket openings.

5. The booster seat of claim 4 wherein each arm rest includes a cantilevered flange, and wherein each flange includes one of said arm rest openings.

6. The booster seat of claim 5 wherein each arm rest includes a stop surface which is shaped to engage an associated bracket to limit the pivoting motion of said arm rest.

7. A booster seat for being coupled to a vehicle seat and supporting a child occupant thereon comprising:

a body including a seat back and a seat pan for supporting an occupant thereon;

a seat belt guide coupled to said body for receiving a vehicle belt therethrough and guiding said vehicle belt over an occupant located on said body;

an adjustable thigh support coupled to said seat pan and being movable closer to or further away from said seat pan;

a pair of adjustable arm rests coupled to said body, each arm rest being located on opposed sides of said body and being pivotable about an axis that extends generally transverse to said body;

a pair of head rests coupled to said seat back, each head rest being located on opposed sides of said seat back and being pivotable about an axis that extends generally along the height of said body wherein each head rest includes a generally downwardly extending rod that is received in said seat back to pivotally couple each head rest to said body; and wherein each rod includes a pin extending generally transversely to said rod, and wherein seat back includes a pair of guide recesses, each guide recess receiving one of said pins therein, and wherein each pin and the associated guide recess cooperate such that each head rest can be maintained in a retracted position, wherein said head rest is generally flush with said seat back, and an extended position wherein said head rest forms an angle with said head rest.

8. The booster seat of claim 7 wherein each guide recess includes a ramp, and wherein each pin rides up and over an associated ramp when the associated head rest is moved from the retracted position to the extended position.

9. A booster seat for being coupled to a vehicle seat and supporting a child occupant thereon comprising:

a body including a seat back, a seat pan for supporting an occupant thereon, and a pair of brackets located on opposed sides of said body, each bracket having a bracket opening;

a seat belt guide coupled to said body for receiving a vehicle belt therethrough and guiding said vehicle belt over an occupant located on said body, wherein said seat does not include any occupant-retaining seat belts directly coupled to said body; and a pair of adjustable arm rests coupled to said body, each arm rest being located on opposed sides of said body and having a stub received in one of said bracket openings to pivotally couple each arm rest to said body such that each arm rest is pivotable about an axis that extends generally transverse across said body; and wherein each bracket includes a protrusion and wherein each arm rest includes an arm rest opening shaped to receive one of said protrusions therein to pivotally couple the associated arm rest to the associated bracket.

10. The booster seat of claim 9 wherein each protrusion includes at least part of one of said bracket openings.

11. The booster seat of claim 9 wherein each arm rest includes a cantilevered flange, and wherein each flange includes one of said arm rest openings located therein.

12. A booster seat for being coupled to a vehicle seat and supporting a child occupant thereon comprising:

a body including a seat back, a seat pan for supporting an occupant thereon, and a pair of brackets located on opposed sides of said body, each bracket having a bracket opening;

a seat belt guide coupled to said body for receiving a vehicle belt therethrough and guiding said vehicle belt over an occupant located on said body, wherein said seat does not include any occupant-retaining seat belts directly coupled to said body; and a pair of adjustable arm rests coupled to said body, each arm rest being located on opposed sides of said body and having a stub received in one of said bracket openings to pivotally couple each arm rest to said body such that each arm rest is pivotable about an axis that extends generally transverse across said body; and wherein each arm rest includes a cantilevered stub flange, and wherein each stub is located on one of said stub flanges.

13. A booster seat for being coupled to a vehicle seat and supporting a child occupant thereon comprising:

a body including a seat back and a seat pan for supporting an occupant thereon;

a seat belt guide coupled to said body for receiving a vehicle belt therethrough and guiding said vehicle belt over an occupant located on said body; and a pair of head rests coupled to said seat back, each head rest being located on opposed sides of said seat back and being pivotable about an axis that extends generally along the height of said body, each head rest being pivotal between a retracted position wherein said head rest is generally flush with said seat back and an extended position wherein said head rest forms an angle with said seat back, said seat further including a retaining mechanism that can maintain each head rest in at least one of said retracted or extended position, said retaining mechanism retaining said head rest in said at least one of said retracted or extended position such that a force required to move said head rest out of said one of said retracted or extended position is greater than a force required to move said head rest when said head rest is in a location such that said head rest not in said one of said retracted or extended position; and wherein each head rest includes a generally downwardly extending rod that is received in said seat back to pivotally couple each head rest to said body, and wherein each head rest is pivotal about said rod; and wherein each retaining mechanism includes a generally transversely extending pin coupled to said rod, and wherein seat back includes a pair of guide recesses, each guide recess receiving one of said pins therein; and wherein each guide recess includes a ramp, and wherein each pin rides up and over an associated ramp when the associated head rest is moved from its retracted position to its extended position; and wherein said body engages each rod and pulls each rod generally downwardly such that each pin is pulled against the associated ramp as each head rest moves from its retracted position to its extended position.

14. The booster seat of claim 13 wherein each guide recess includes a pair of plateau portions located on either side of each ramp, and wherein each pin in located on a first one of said plateau portions when the associated head rest is in said retracted position, and wherein each pin is located on a second one of said plateau portion when the associated head rest is in said extended position.

15. The booster seat of claim 14 wherein said second plateau portion is located generally above said first plateau portion.

16. A booster seat for being coupled to a vehicle seat and supporting a child occupant thereon comprising:

a body including a seat back, a seat pan for supporting an occupant thereon, and a pair of brackets located on opposing sides of said body, each bracket having a bracket opening;

a seat belt guide coupled to said body for receiving a vehicle belt therethrough and guiding said vehicle belt over an occupant located on said body, wherein said seat does not include any occupant-retiring seat belts directly coupled to said body; and a pair of adjustable arm rests coupled to said body, each arm rest being located on opposed sides of said body and having a stub received in one of said bracket openings to pivotally couple each arm rest to said body such that each arm rest is pivotable about an axis that extends generally transverse across said body; and wherein said stub is fixedly and non-removably coupled to said arm rest.

* * * * *